No. 689,690. Patented Dec. 24, 1901.
R. R. PURVES.
MACHINE FOR PRESSING PLASTIC MATERIAL INTO THE INTERSTICES OF CORNCOB PIPES.
(Application filed June 10, 1901.)
(No Model.)
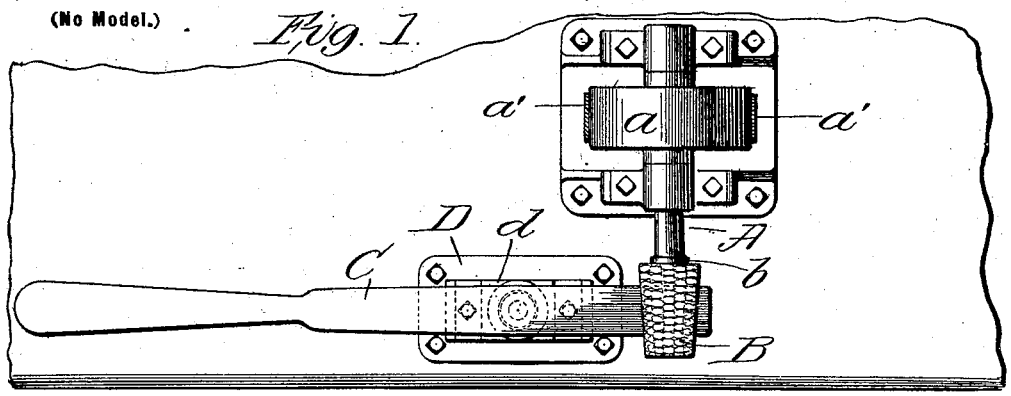
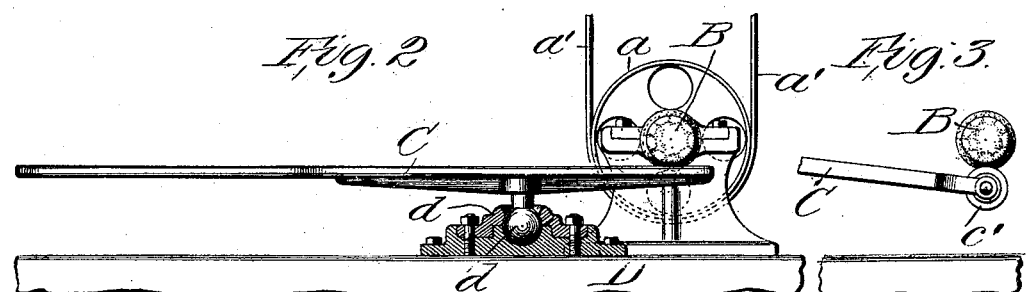
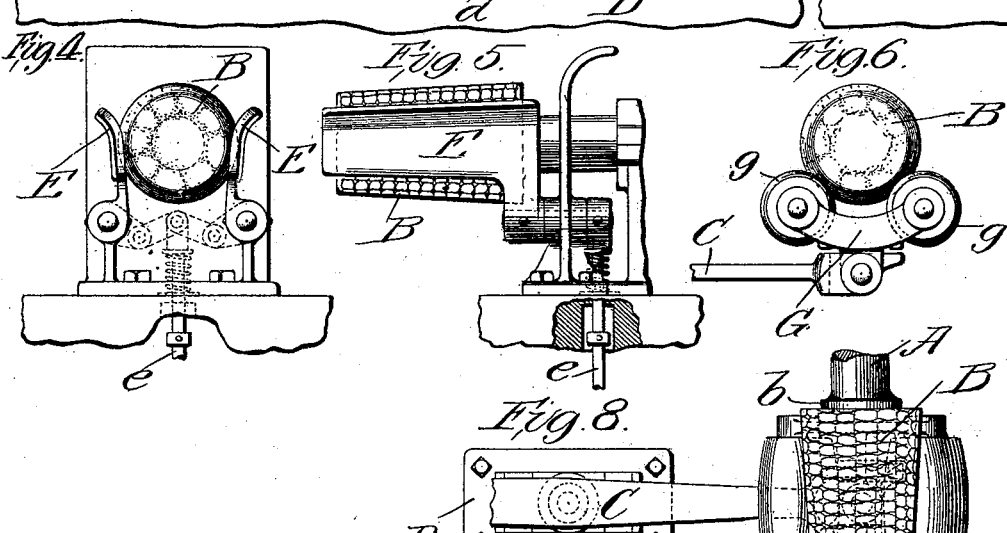
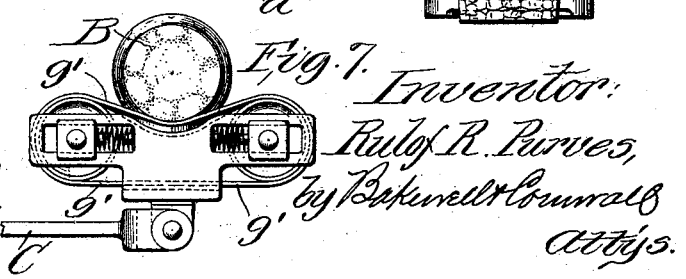
Inventor:
Ralph R. Purves,

UNITED STATES PATENT OFFICE.

RULOF R. PURVES, OF WASHINGTON, MISSOURI, ASSIGNOR TO H. TIBBE & SON MFG. COMPANY, OF WASHINGTON, MISSOURI, A CORPORATION OF MISSOURI.

MACHINE FOR PRESSING PLASTIC MATERIAL INTO THE INTERSTICES OF CORNCOB PIPES.

SPECIFICATION forming part of Letters Patent No. 689,690, dated December 24, 1901.

Application filed June 10, 1901. Serial No. 63,945. (No model.)

*To all whom it may concern:*

Be it known that I, RULOF R. PURVES, a citizen of the United States, residing at Washington, county of Franklin, State of Missouri, have invented a certain new and useful Improvement in Machines for Pressing Plastic Material into the Interstices of Corncob Pipes, of which the following is a full, clear, and exact description, such as will enable others skilled in the art to which it appertains to make and use the same, reference being had to the accompanying drawings, forming part of this specification, in which—

Figure 1 is a top plan view of a generic form of my improved machine for pressing plastic material into the interstices of corncob pipes. Fig. 2 is a side elevational view, partly in section. Fig. 3 is a detail view of a developed form of the pressing portion of the presser-bar. Fig. 4 is an end elevational view of an amplified arrangement of presser-bars. Fig. 5 is a side elevational view of the construction shown in Fig. 4. Fig. 6 is a side elevational view illustrating a further development of the pressing portion of the presser-bar. Fig. 7 is a similar view of a different form of presser-bar, and Fig. 8 is a top plan view of a still further development of the pressing portion of the presser-bar.

This invention relates to a new and useful improvement in a machine for pressing plastic material into the interstices of corncob pipes, the object being to simplify this operation in the manufacture of pipes of the character described and to more effectively press the plastic material into the interstices or recesses appearing in the outer faces of the walls of the pipe.

With these objects in view the invention consists in the arrangement, construction, and combination of the several parts, all as will hereinafter be described, and afterward pointed out in the claims.

Heretofore in the manufacture of corncob pipes plastic material, usually in the form of plaster-of-paris in a plastic state, has been applied to the outer surface of a corncob pipe manually. The operator would take the plastic material in one hand and slipping the bowl of the pipe on a rotating mandrel apply the plastic material to the outer face thereof. In this operation the plastic material would not be forced with any considerable amount of pressure into the interstices, due to the roughness of the pipe and the liability of blistering the hands of the operator and making the same sore by repeated operations. Consequently the pipes were but imperfectly supplied with the plastic material on their outer faces. Furthermore, it frequently happens that too much material is applied to the pipe, with the result that when the material dries it cracks, and when the outer surface of the pipe is sandpapered for the purpose of applying shellac or varnish in the finish of the pipe the plastic material, which has become hard, will flake or scale off, so that it is necessary to rehandle the pipe and again apply plastic material thereto.

The main object of this present invention is to save the hands of the operator and also to uniformly and effectively force the plastic material down into the interstices of the pipe, so that said plastic material upon drying would have a firm hold in the interstices and not be liable to be displaced in the operation of sandpapering or smoothing the pipe preparatory to the application of varnish thereto. Incidentally by the use of my invention and in addition to the above the pipe requires less finish in the way of sandpapering, because the plastic material is more smoothly and uniformly applied.

In Fig. 1 of the drawings I have shown merely a generic form of the pressing apparatus; but in Fig. 4 I have illustrated the developed construction of the apparatus with relation to the arrangement of the presser-bars, and in Fig. 8 I have shown the developed form of the pressing-surface provided upon the said presser bar or bars. The intermediate forms in the development of this pressing-surface are shown in Figs. 3 and 6.

I shall first describe the invention in the generic features illustrated in Fig. 1.

In the drawings, A indicates a spindle mounted in suitable bearings on a table or other support, which spindle is provided with a pulley *a*, on which passes a driving-belt *a'*. This spindle projects laterally beyond one of the bearings to form a mandrel *b* for receiving the bowl of the pipe B.

C indicates a lever or presser-bar mounted in juxtaposition to the mandrel, said lever having a handle by which it may be manipulated by the operator, while the inner or working end of the lever has, in the generic form shown in Fig. 1, a pressing portion which is in the form of a flat paddle or blade arranged under the bowl of the pipe. The lever is fulcrumed in a supporting-plate D, which forms a step-bearing, the cap $d$ of said plate coöperating therewith and providing a spherical socket for a ball $c$, arranged upon a suitable stem secured to the lever C. In this manner the lever is susceptible of universal movement through this ball-and-socket joint and may be tilted or canted to accommodate the shape of the bowl, as well as oscillating laterally to evenly distribute the filling material throughout the length of the bowl.

In operation the bowl of the pipe is placed on the mandrel, the lever being swung out of the way so as not to interfere with this operation. The operator then applies the plastic material to the face of the bowl, leaving a surplus thereon, after which the lever is brought into play to force the plastic material into the interstices and recesses in the outer faces of the bowl and at the same time smooth and give to the bowl a good finish, the lever delivering the plastic material evenly throughout the surface of the bowl. The bowl is now removed from the spindle, sandpapered, and varnished, when it is finished.

In Fig. 3, which shows the first step in developing the pressing-surface from the generic form illustrated in Fig. 1, instead of having a flat paddle I provide a roller $c'$ in the end of the lever C for coöperating with the bowl.

In Figs. 4 and 5 I have shown the developed arrangement in which two presser-bars E are pivotally mounted on opposite sides of the mandrel for coöperating with the bowl, said bars being connected together by links in the form of a toggle-joint, to the common pintle of which is arranged a rod $e$, designed to extend under the support and be operated by the operator's foot. Although for the purpose of simplifying the drawings I have not so shown the apparatus in said figures, it will be apparent that in the fully-developed form of the device said bars E are provided with the rollers shown in Fig. 8.

In Fig. 6, which illustrates further development of the pressing-surface, I have shown a frame G, mounted on the end of a lever, said frame carrying rollers $g$, designed to coöperate with the pipe-bowl on the mandrel at two points.

In Fig. 7 I have shown a construction similar to that illustrated in Fig. 6, with the exception that I have arranged an endless belt $g'$ over the rollers, the operation of which will be readily understood.

In Fig. 8 I have shown the fully-developed form of pressing-surface, comprising two barrel-shaped rollers, whose diameters are such that the pivoted lever in being swung to cause contact between the rollers and the pipe-bowl at different points will enable said rollers to coöperate with the pipe-bowl and have a flat bearing thereon.

I am aware that many minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. In a machine of the character described, the combination with a rotating mandrel designed to receive the bowl of a cob pipe, and a pivoted lever arranged in juxtaposition to said bowl for pressing plastic material into the interstices or recesses in the surface of said bowl, said lever also having lateral oscillation; substantially as described.

2. In a machine of the character described, the combination with a rotating mandrel designed to receive the bowl of a cob pipe, and means for pressing plastic material into the interstices or recesses in the outer surface of said bowl, the mechanism also uniformly distributing the plastic material over the bowl; substantially as described.

3. In a machine of the character described, the combination with a mandrel designed to receive the bowl of a cob pipe, and a lever having a universal movement for coöperating with the outer surface of said bowl and pressing the plastic material into the interstices or recesses therein; substantially as described.

4. In a machine of the character described, the combination with a mandrel designed to receive the bowl of a cob pipe, of levers arranged on opposite sides of said bowl, and means for forcing said levers against the surface of the bowl, whereby said levers press plastic material into the interstices in the bowl; substantially as described.

5. In a machine of the character described, the combination with a mandrel designed to receive the bowl of a cob pipe, of a lever provided with a plurality of rollers operating at different points upon the bowl to press plastic material into the interstices therein; substantially as described.

6. In a machine of the character described, the combination with a mandrel designed to receive the bowl of a cob pipe, of a lever having lateral oscillation, and rollers mounted on said lever, said rollers being barrel-shaped so as to have an extended bearing on the surface of the bowl in different lateral positions of the lever for forcing plastic material into the interstices in the bowl; substantially as described.

In testimony whereof I hereunto affix my signature, in the presence of two witnesses, this 6th day of June, 1901.

RULOF R. PURVES.

Witnesses:
 U. L. WEIRICK,
 GEO. H. PIKE.